Sept. 15, 1959 C. ZELNICK 2,904,282
SPRING REEL MEASURING TAPE
Filed June 4, 1957 2 Sheets-Sheet 1

INVENTOR.
CHARLES ZELNICK
BY
ATTORNEYS

Sept. 15, 1959

C. ZELNICK 2,904,282

SPRING REEL MEASURING TAPE

Filed June 4, 1957

INVENTOR.
CHARLES ZELNICK
BY
*Fearman & Fearman*
ATTORNEYS

United States Patent Office 2,904,282
Patented Sept. 15, 1959

2,904,282

SPRING REEL MEASURING TAPE

Charles Zelnick, Saginaw, Mich., assignor to Lufkin Rule Company, Saginaw, Mich., a corporation of Michigan Application June 4, 1957, Serial No. 663,446

6 Claims. (Cl. 242—107)

This invention relates to measuring tapes or tape measures and more particularly to measuring tapes or rules of the type having a measuring ribbon coiled within a casing and power means for rewinding or recoiling the tape or ribbon once it has been withdrawn from the casing.

Measuring tapes of this description have been used for many years and powerful spring motors have been provided within the casing for rotating the drum or spool on which the tape is secured in a direction to draw the tape back into the casing. With tape measures of any length the spring must be quite powerful to revolve the drum onto which the extended tape is to be withdrawn and considerable speed is developed by the withdrawing tape particularly at the point where all but a few feet of the tape have been retracted into the casing. Measuring tapes having metallic tape ribbons are for this reason somewhat dangerous to use for the sharp edges of these tapes are apt to contact exposed portions of the hands or face of the user when the tape is lashing back into its casing. Also the clips which are provided at the ends of the tape and prevent its withdrawal into the casing are relatively short lived because they tend to shear off under the action of the tape continually snapping sharply into the casing.

In order to retain the tape in extended position laterally projecting ratchet teeth have been provided on a radial wall of the tape drum which are engaged by an axially disposed wheel or part having spokes capable of engaging between the ratchet teeth and releasably preventing rotation of the drum in one direction. A spring, releasing the wheel on depression of a pushbutton, normally maintains the spokes of the wheel in engagement with the ratchet teeth and the ratchet teeth have of course, been formed so that spokes of the wheel permit rotation of the drum only in a tape unwinding direction. When the pushbutton is pressed, the wheel moves axially outwardly from the ratchet teeth on the drum and the spring motor is free to draw the tape back into the casing. It has been the practice for users of such tape measures to attempt to control the speed with which the tape ribbon moves back into the casing by only partially depressing the push button when the drum begins to build up speed near the end of the tape retracting operation so that the spokes of the wheel are not entirely removed from engagement with the teeth on the drum. The retarding effect obtained in this manner is not smooth, however, and is quite noisy. Occasionally also the user forgets to handle the tape in this manner and the tape is then free to snap back into the casing under the full force of the spring.

Various other speed retarding means have been suggested which are somewhat similar in nature in that a toothed member is provided on the drum which is slowed in revolution by an escapement type pawl, however, retraction of the tape with such a construction is also noisy and is not as smooth as desired. This last mentioned construction and a dash pot arrangement which was proposed are also objectionable in that they so affect the operation of the drum that a heavier spring motor must be used inasmuch as the same opposition to revolution of the drum is applied regardless of the degree of extension of the tape and the speed at which the drum is traveling.

It is one of the prime objects of the instant invention to provide a governor or governing construction for measuring tapes which utilizes centrifugal force to slow the spool or drum so that the speed of the drum is a factor in the degree of retardation applied.

It is a further object of the invention to provide a governor construction in a measuring tape which is in continuous operation to slow the revolution of the drum as required and does not employ teeth or a tooth member which creates an undesirable clicking noise of some severity and has a jerky and uneven retarding effect.

More specifically it is an object of the instant invention to provide multiple and independently operable governing members which operate out of phase to slow the drum and do not require a tape casing of increased thickness to accommodate them.

A further important object of the invention is to provide a construction of the character described in which relatively frictionless retarding means are employed which have practically no retarding effect when the tape is extended a considerable distance and the spring is slowly withdrawing it into the casing.

Still a further object of the invention is to provide a governor construction for a measuring tape which is very smooth in operation and is relatively noiseless.

Another object of the invention is to provide a tape measure including governing means operable to control the speed of retraction of the extended tape which is positive and reliable in operation, wears well, and has a longer operating life than other constructions of this type, and is more economical to manufacture and assemble.

A further object of the invention is to design a tape measure including governor means and a novel spring for holding the tape in extended position which operates in association with the governor means.

With the above and other objects in view, the present invention consists in the combination and arrangement of parts hereinafter more fully described, illustrated in the accompanying drawing, and more particularly pointed out in the appended claims, it being understood that equivalent changes may be made in the various elements which comprise the invention without departing from the spirit thereof or the scope of the appended claims.

In the drawings, Figure 1 is a transverse, sectional view through a tape measure taken on the line 1—1 of Figure 2 in which the tape is shown in retracted position.

Figure 2:
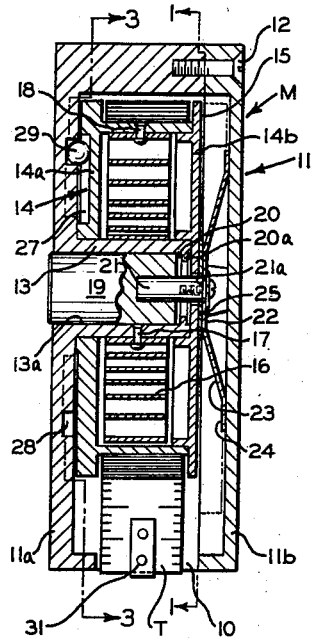
Figure 2 is a sectional, edge elevational view taken on the line 2—2 of Figure 1.
Figure 1:
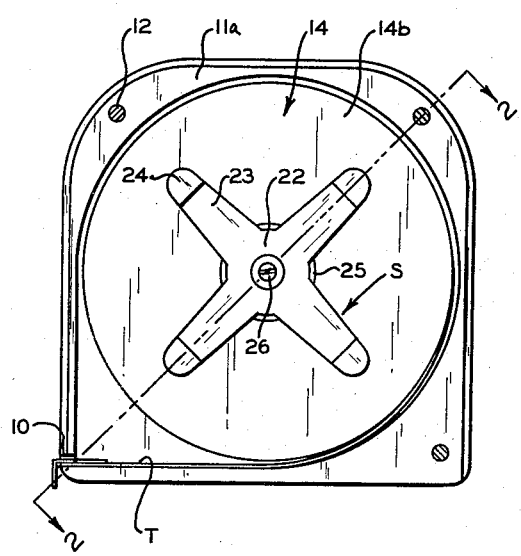
Figure 3:
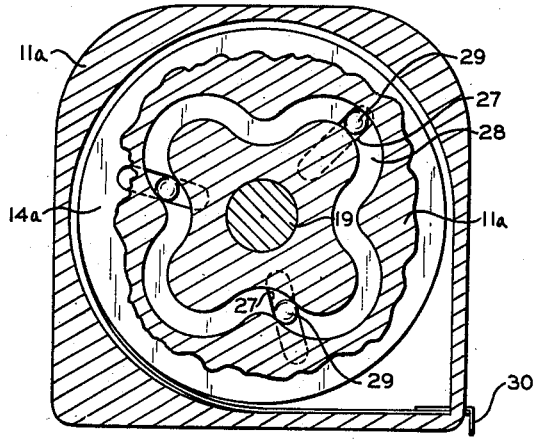
Figure 3 is a transverse, sectional view taken on line 3—3 of Figure 2 and illustrating one form of race which may be employed.

Referring now more particularly to the accompanying drawings in which I have illustrated preferred embodiments of the invention, and in the first instance to Figures 1–3 thereof, a letter M generally indicates a measuring tape or tape measure having a tape or elongated member T which is withdrawable from an opening 10 provided in the usual manner in its casing 11. The casing 11 is formed for ease of assembly in two parts 11a and 11b which can be easily secured in assembled or mating relation by screws 12. Revolvably mounted on the casing section 11a which includes the tubular portion 13 is a tape spool or drum 14. The drum 14 is preferably formed of two mating sections 14a and 14b which when fixed in assembled relation provide a peripheral groove 15 for receiving the convolutions of the coiled measuring tape T.

Provided within the drum 14 is a spring motor 16 which is secured to hub section 13 by a rivet 17 and to the drum 14 by the same rivet 18 which secures the innermost end of the measuring tape ribbon T to the drum. When the drum 14 is revolved in a direction to unwind the measuring tape T from the casing 11, the spring 16 will be wound up and, when the braking force holding the tape T in extended position is released, spring 16 will wind the tape back into the casing. The construction thus far described is conventional and forms no part of the instant invention except in combination with the novel elements which will now be described.

Slidably received within the bore 13a of the hub section 13 of the casing which opens to the outer face of the radial side wall of casing section 11a is a push button 19 which is normally held a spaced distance 20 from a flange 20a on the inner wall of hub 13 by a plug 21 which extends through the radial side wall of drum section 14b. A flexible, resilient, metal spring S of generally cruciform configuration has a base portion 22 and angularly disposed leg portions 23 provided with shoe sections 24 which bear against the radial wall of the casing section 11b. The spring S is normally in compressed condition as indicated in Figure 2 and exerts a force against the wall of the section 14b of the drum which opposes rotation of the drum sufficiently to hold the tape T in any extended position, but does not exert sufficient force to make withdrawal of the tape from the casing 11 difficult. When the tape T is in extended position and button 19 is pressed inwardly, the spring S is flattened out and is no longer in engagement with the washer 25 so does not oppose the retracting rotation of drum 14. It will be seen that the plug 21 is shouldered as at 21a so that when the button 19 is pushed inwardly the body section 22 of the spring is similarly displaced inwardly. So far as I am aware the spring S which has leg sections 23 extending radially to all corners of the casing is of novel configuration and provides for the first time in conjunction with governor means which will be described a balanced pressure which prevents tilting of the drum 14 within the casing.

Provided within the radial or side wall of the drum section 14a are a trio of uniformly circumferentially spaced, radially extending grooves 27, as shown particularly in Figure 3 and a race 28 is provided on the inner face of the radial wall of casing section 11a adjacent and opposite to the grooves 27 as shown. Spherical ball bearings 29 are of such a diameter as to ride in both the race 28 and the grooves 29 (see Figure 2) and the shape of the race 28 is determined by the number of grooves 27 and their disposition. The race is sinuous in shape as shown and in any one moment each of the balls 29 is traveling in a portion of the race out of phase with the other balls 29. In Figure 3, for example, the ball at the upper right hand portion of the figure is in an outer portion of the symmetrical race while the ball 29 at the bottom of the figure is close to an inner portion of the race and the other ball is somewhere in between the inner and outer portions of the race.

In operation, as the drum 14 revolves, the balls 27 must continuously follow the sinuous path of the race 28, of course, and in so doing move radially inwardly and outwardly in the grooves 27 on the drum wall. The travel of the balls is smooth and uninterrupted as opposed to previously proposed escapement constructions in which the action is jerky because the force is applied as a series of engagements and releases. Applicant's novel construction avoids entirely the use of toothed members which retard by intermittent impact and provides a smoothly operating, non-vibratory, retarding assembly of different and superior design.

In the assembly of the measuring case, with the drum 14 in position in the casing section 11b, a dab of relatively heavy grease is placed in each groove or slot 27 and the ball bearing 29 is then placed in the portion having the grease so that it will be held in position while the section 11a is being placed in mating relation with section 11b. By jockeying the rotary or angular position of the casing 11a slightly the balls 29 will assume a position in grooves 27 such that they will be simultaneously accommodated in the race 28. Because 3 balls 29 are employed as shown a three point bearing is obtained to support the drum without its tilting and binding the tape in opening 10. The balls operate in association with the spring S to achieve this result.

When the user is pulling the tape from the casing, the drum 14 is moving at a relatively slow speed and the relatively frictionless balls 29 move smoothly in the race 28. Because of the slow speed of the drum relatively minor centrifugal forces are developed and there is little opposition to rotation of the drum. When it is desired to retract the tape from extended position and button 19 is pushed inwardly, the force of spring 16, which has been wound tightly from its normal position, causes the drum to accelerate rapidly and build up considerable speed which tends to cause the tape to lash back and forth. As the speed of the drum increases, the centrifugal force developed by the balls 29 rapidly increases and a controlled retarding force is developed which prevents the drum from revolving at an unduly rapid rate. This is accomplished smoothly without any noise of consequence particularly when the balls 29 are formed of a hard plastic material such as nylon. With such balls 29 very little wear will be noticed even after the measuring tape has been used for a long period of time and the race 28 will not tend to be hammered out. At the outset of the retracting operation when it is desired that the tape attain a satisfactory rewinding speed, the balls 29 offer relatively little resistance to rotation, however, as the speed increases so does the controlling force exerted by the balls. Regardless of whether the balls 29 are moving radially inwardly or outwardly in the grooves 27, centrifugal force is operating to retard the speed of the drum 14 for, when the balls are moving outwardly they are restrained by their engagement with the outer marginal wall of the raceway, and in order to move inwardly they must, of course, overcome the centrifugal forces developed. Further, since the balls are "out of phase" retarding force is being applied substantially uniformly at all times. Moreover, because the races are disposed on the radial wall of the casing the shape of the periphery of the casing is unaffected by the construction and no valuable peripheral space need be allotted to the governor assembly. The tape T is shown in Figures 1–3 as having a clip 30 riveted to the end of the ribbon as at 31 and previously this clip has had a relatively short service life because of the speed with which the tape snaps back into the casing. With the present construction this speed is controlled and the service life of the tape is considerably increased. The groove 28 in the wall of casing section 11a could, of course, be replaced with a groove in a nylon or other hard plastic plate or disc which was rigidly secured to the inner face of the radial wall of the casing section. Accordingly, when the term "casing" is used in the claims it is to be understood that it includes other members which it may carry, which may have operative engagement with the members carried by the drum.

Figure 4:
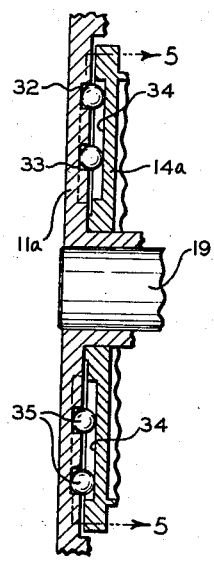
Figure 4 is a fragmentary, sectional view similar to Figure 2 of a modification of the invention.
Figure 5:
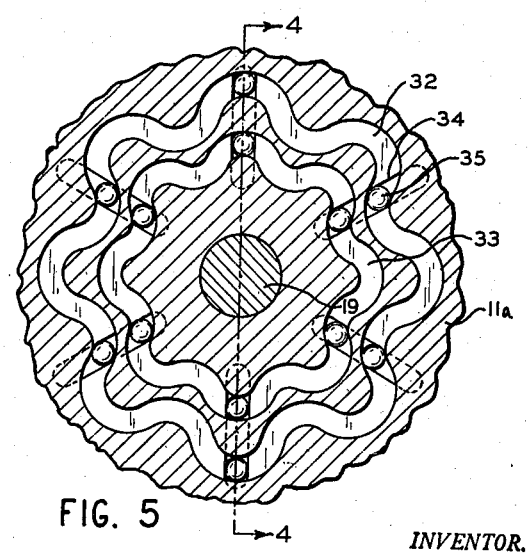
Figure 5 is a sectional view taken on the line 5—5 of Figure 4.

The governing effect of the novel construction which I have disclosed can be easily multiplied without increasing the width of the casing at all. In Figures 4 and 5 I have shown a modification of the invention in which a pair of bearing races 32 and 33 are provided in the radial wall of section 11a of the casing 11 directly opposite grooves 34 which are provided in the wall of drum section 14a as before. It will be seen that each groove 34 can accommodate two ball bearings 35, each of which is guided or travels in a different race. In this embodiment of the invention the governing effect is increased both, because the raceways are more sinuous in nature, and because multiple balls and races are employed. The operation and assembly of this embodiment of the invention is, of course, identical to the operation and assembly of the embodiment previously described and for convenience sake similar numerals 11a, 14a and 19 have been employed to designate the like parts. All of the races and balls of the modification being described can be disposed in the same plane and while I have chosen to show but two races it is to be understood that additional races could have been shown.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

In the claims:

1. A tape measure construction comprising: a casing member having a tape opening therein; a measuring tape coiled in said casing member having one of its ends extending through the said opening; motor means in said casing member connected with said tape to return the tape to the casing member when a portion of it has been drawn from said casing member; a second member in said casing member connected with said tape and revolvable when said tape is drawn into the casing member; and governor means reacting between said members in opposition to said motor means for retarding rotation of said second member under the influence of said motor means, said governor means comprising at least one recess in one of said members extending generally radially of the axis of rotation of said second member, at least one endless track surface in the other of said members located circumferentially with respect to the axis of rotation of said second member and having portions of its length at varying distances from said axis; and at least one retarding element carried by said second member and revolving about the axis of rotation thereof received by said recess and by said track surface so that it moves radially in and out while revolving about the said axis of rotation and exerts a varying centrifugal force dependent on the speed of said second member and tape.

2. The combination defined in claim 1 in which multiple, circumferentially spaced, retarding elements are received by said track surface and located at any instant at radially varying distances outwardly from the said axis of rotation.

3. A tape measure construction comprising; a stationary casing member having a tape opening therein; a measuring tape coiled in said casing member having one of its ends extending through the said opening; motor means in said casing member connected with said tape to return the tape to the casing member when a portion of it has been drawn from said casing member; a drum member in said casing member connected with said tape and having an end face revolvable when said tape is drawn into the casing member; and governor means reacting between said members in opposition to said motor means for retarding rotation of said end face of said second member under the influence of said motor means; said governor means comprising at least one recess in the said end face of the drum member extending generally radially of the axis of rotation of said drum member, at least one endless track surface in the adjacent surface of the casing located circumferentially with respect to the axis of rotation of the drum member and having portions of its length at varying distances from said axis; and at least one retarding roller element carried by said end face for rotation therewith about said axis of rotation received partly by said recess and partly by said track surface for in-and-out movement in said recess responsive to rotation of the drum member and in-and-out movement of the tape.

4. An elongated member dispenser construction comprising; drum means; an elongated member wound in coils on said drum means, said drum means connecting with said elongated member and having a wall revolvable when said elongated member is wound on said drum means; a fixed member adjacent said wall; motor means connected to return the elongated member to wound condition when it has been withdrawn from said drum means; and governor means reacting between said wall and fixed member in opposition to said motor means for retarding rotation of said wall and elongated member under the influence of said motor means; said governor means comprising at least one recess in said revolvable wall extending generally radially from a location near the axis of rotation of said revolvable wall outwardly therefrom to a location on the same side of the said axis of rotation; at least one endless track surface on the fixed member located circumferentially with respect to the axis of rotation of said revolvable wall and having portions of its length at varying distances from the said axis; and at least one retarding element carried by said revolvable wall for revolution about the said axis received in said recess and engaged with said track surface so that it moves radially in and out while revolving about the said axis and exerts a varying centrifugal force dependent on the speed of said wall and elongated member.

5. The combination defined in claim 4 in which multiple, circumferentially spaced, roller retarding elements mounted circumferentially out of diametric alignment are engaged with said track surface.

6. An elongated member dispenser construction comprising; a stationary casing member having an opening therein; drum means journaled for rotation relative to said casing having an end face rotatable with said drum means; an elongated member coiled on said drum means having one of its ends extending through said opening; spring motor means for said casing member connected with said elongated member to return the elongated member when a portion of it has been drawn off said drum means; and governor means reacting between said end face and casing member in opposition to said motor means for retarding rotation of said drum means under the influence of said motor means; said governor means comprising at least one continuous track surface on the surface of the casing adjacent the drum means located circumferentially with respect to the axis of rotation of the drum means and having portions of its length at varying distances from said axis; plural, generally radially extending, circumferentially spaced, guide surfaces on said end face of the drum means, each extending generally radially from a location near the axis of rotation of said drum means outwardly; and independent, relatively movable retarding elements carried by said guide surfaces for rotation with the drum means about its axis of rotation engaged also with said track surfaces for in-and-out radial movement relative to said guide surfaces while revolving about said axis of rotation to exert a cumulative, varying centrifugal force dependent on the speed of said drum means and elongated member.

References Cited in the file of this patent

UNITED STATES PATENTS

| 1,281,088 | Smith | Oct. 8, 1918 |
| 2,559,111 | Carroll | July 3, 1951 |
| 2,586,386 | Ryan | Feb. 19, 1952 |
| 2,609,256 | Baker | Sept. 2, 1952 |
| 2,762,884 | Van Eyk | Sept. 11, 1956 |

FOREIGN PATENTS

| 708,448 | France | Apr. 28, 1931 |